(12) United States Patent
Rosenberger et al.

(10) Patent No.: US 11,554,854 B2
(45) Date of Patent: Jan. 17, 2023

(54) ADHESIVE PANELS OF MICROVANE ARRAYS FOR REDUCING EFFECTS OF WINGTIP VORTICES

(71) Applicant: Lockheed Martin Corporation, Bethesda, MD (US)

(72) Inventors: Brian T. Rosenberger, Aledo, TX (US); Eric Frederick Charlton, Grapevine, TX (US); Daniel N. Miller, Bainbridge Island, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 287 days.

(21) Appl. No.: 15/930,599

(22) Filed: May 13, 2020

(65) Prior Publication Data
US 2020/0269970 A1    Aug. 27, 2020

Related U.S. Application Data

(63) Continuation of application No. 15/672,860, filed on Aug. 9, 2017, now Pat. No. 10,752,340, which is a continuation of application No. 14/569,270, filed on Dec. 12, 2014, now Pat. No. 9,868,516.

(51) Int. Cl.
*B64C 23/06* (2006.01)
*B64C 21/10* (2006.01)

(52) U.S. Cl.
CPC .............. *B64C 23/06* (2013.01); *B64C 21/10* (2013.01); *B64C 23/065* (2013.01); *Y02T 50/10* (2013.01)

(58) Field of Classification Search
CPC ....... B64C 21/10; B64C 23/06; B64C 23/065; B64C 2230/26
See application file for complete search history.

(56) References Cited

U.S. PATENT DOCUMENTS

| 2,800,291 A | 7/1957 | Stephens |
| 3,776,363 A | 12/1973 | Kuethe |
| 4,354,648 A | 10/1982 | Schenk et al. |
| 4,693,201 A | 9/1987 | Williams et al. |

(Continued)

FOREIGN PATENT DOCUMENTS

| DE | 201 07 863 U1 | 10/2001 |
| EP | 2 484 898 A1 | 8/2012 |

(Continued)

OTHER PUBLICATIONS

Brazilian Preliminary Examination BR102015031082-0, dated May 8, 2020.

(Continued)

*Primary Examiner* — Joseph W Sanderson
(74) *Attorney, Agent, or Firm* — Baker Botts L.L.P.

(57) ABSTRACT

A wing includes a low pressure side, a high pressure side opposite the low pressure side, and a drag reducing apparatus coupled to the low pressure using an adhesive. The drag reducing apparatus includes a first side coupled to the low pressure side of the wing, and a second side opposite the first side. The second side includes a plurality of vortex generators arranged in an array configuration. The vortex generators generate one or more vane vortices near an end of the low pressure side of the wing, thereby weakening a wingtip vortex generated by the wing.

19 Claims, 3 Drawing Sheets

(56) References Cited

U.S. PATENT DOCUMENTS

| | | | |
|---|---|---|---|
| 5,058,837 | A | 10/1991 | Wheeler |
| 5,340,054 | A | 8/1994 | Smith et al. |
| 6,837,465 | B2 | 1/2005 | Lisy et al. |
| 7,100,969 | B2 | 9/2006 | Choi et al. |
| 7,334,760 | B1 | 2/2008 | Lisy et al. |
| 7,914,259 | B2 * | 3/2011 | Godsk ............... F03D 1/0641 416/228 |
| 8,210,482 | B2 | 7/2012 | Miller et al. |
| 8,226,038 | B2 | 7/2012 | Smith et al. |
| 8,240,616 | B2 | 8/2012 | Miller et al. |
| 8,353,482 | B2 | 1/2013 | Miller et al. |
| 8,413,928 | B2 | 4/2013 | Rawlings et al. |
| 8,523,115 | B2 | 9/2013 | Essenhigh et al. |
| 8,656,957 | B2 | 2/2014 | Babinsky et al. |
| 8,657,238 | B2 | 2/2014 | Fox et al. |
| 8,870,124 | B2 | 10/2014 | Ireland |
| 9,868,516 | B2 | 1/2018 | Rosenberger et al. |
| 9,896,192 | B2 | 2/2018 | Domek et al. |
| 10,752,340 | B2 * | 8/2020 | Rosenberger ......... B64C 23/065 |
| 2006/0134379 | A1 | 6/2006 | Pulkka |
| 2009/0020652 | A1 | 1/2009 | Rincker et al. |
| 2011/0006165 | A1 | 1/2011 | Ireland |
| 2011/0008174 | A1 | 1/2011 | Ireland |
| 2012/0049001 | A1 | 3/2012 | Smith et al. |
| 2012/0257977 | A1 * | 10/2012 | Jensen ............... F03D 1/0608 416/223 R |
| 2013/0009016 | A1 | 1/2013 | Fox et al. |
| 2013/0146715 | A1 | 6/2013 | Domel et al. |
| 2013/0255796 | A1 | 10/2013 | Dimascio et al. |
| 2015/0329200 | A1 | 11/2015 | Barrett |
| 2015/0336659 | A1 | 11/2015 | Zhong et al. |
| 2016/0052621 | A1 | 2/2016 | Ireland et al. |
| 2017/0137116 | A1 | 5/2017 | Ireland et al. |

FOREIGN PATENT DOCUMENTS

| | | |
|---|---|---|
| EP | 2 604 516 A2 | 6/2013 |
| WO | WO 90/11929 | 10/1990 |
| WO | WO 2001/016482 A1 | 3/2001 |
| WO | WO 2015/030573 A1 | 3/2015 |

OTHER PUBLICATIONS

Brazilian Search Report translation BR102015031082-0, dated May 6, 2020.

Brazilian Search Report—relevance of the cited documents, dated May 6, 2020.

Servicio Publico Federal Brazil, Patent Office, Written Opinion re BRI02015031082-0 with translation, dated Feb. 22, 2022.

Epo Official Communication pursuant to Article 94(3) EPC, Appln. 15 198 368.1-1010, dated Aug. 6, 2020.

Canadian Application No. 3,080,216, Canadian IP Office Action, dated Jun. 18, 2021.

EPO Germany, Extended European Search Report and Written Opinion for Application No./Patent No. 15198368.1-1754, Ref. EP 103630GM900ch, dated Apr. 13, 2016.

Canadian Patent Office, Office Action regarding Appln. No. 2,913,710, dated Apr. 8, 2020.

Estrand, Adam M., "On the Stability and Control of a Trailing Vortex," Master Thesis, Florida State University, 2016. Florida State University Libraries. Available at: http://diginole.lib.fsu.edu/islandora/objects/fsu%360348, 2016.

Canadian Patent Office Action regarding Application No. 3,080,216, dated Apr. 13, 2022.

* cited by examiner

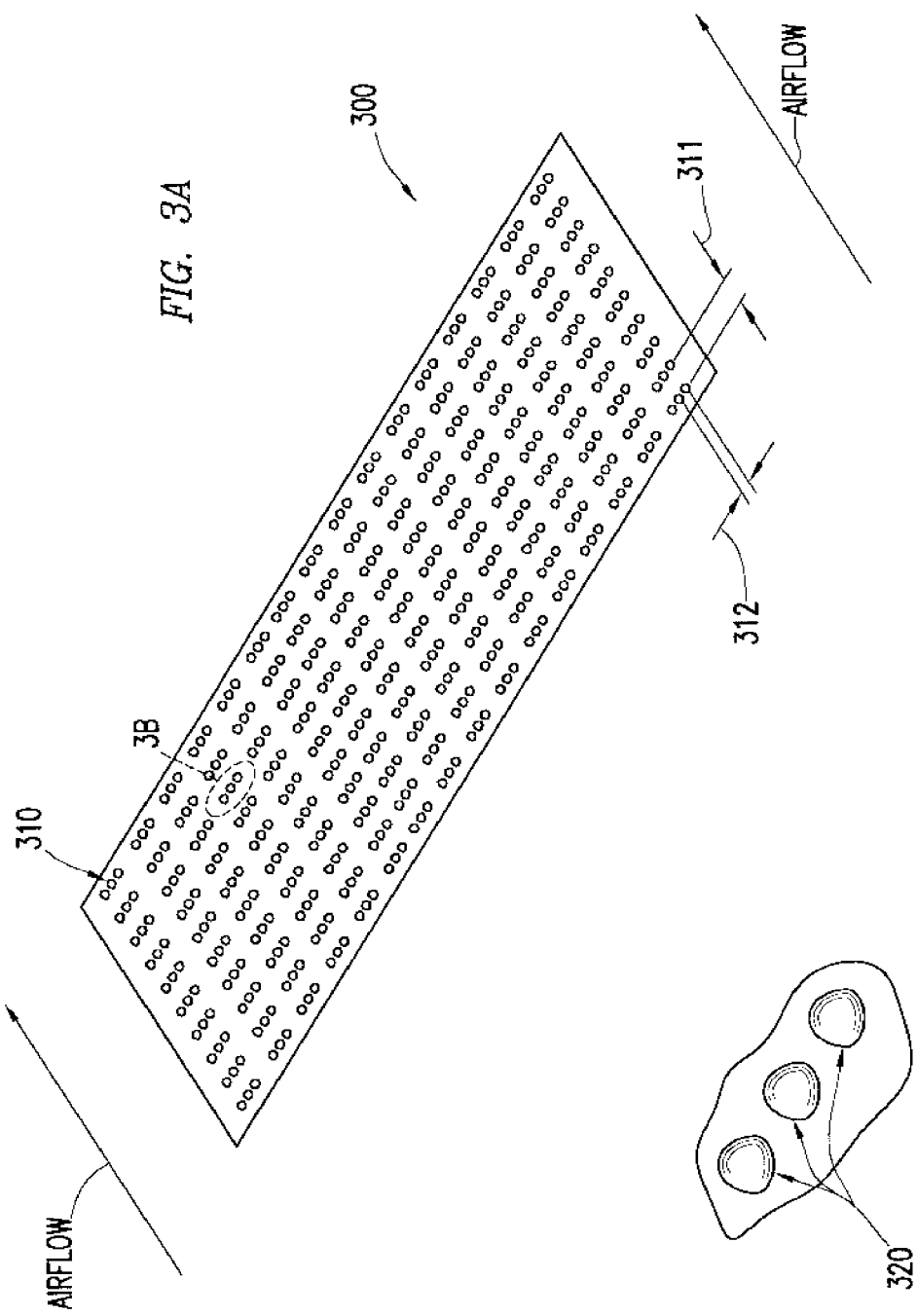

ADHESIVE PANELS OF MICROVANE ARRAYS FOR REDUCING EFFECTS OF WINGTIP VORTICES

CROSS-REFERENCE TO RELATED APPLICATION

This application is a continuation of U.S. patent application Ser. No. 15/672,860 filed Aug. 9, 2017 entitled "Adhesive Panels of Microvane Arrays for Reducing Effects of Wingtip Vortices," which is a continuation of U.S. patent application Ser. No. 14/569,270 filed Dec. 12, 2014 and entitled "Adhesive Panels of Microvane Arrays for Reducing Effects of Wingtip Vortices," now U.S. Pat. No. 9,868,516.

TECHNICAL FIELD

This disclosure generally relates to drag reduction systems for wings and more specifically to adhesive panels of microvane arrays for reducing adverse effects of wingtip vortices.

BACKGROUND

Wingtip vortices are patterns of rotating air left behind a wing as it generates lift. Wingtip vortices may typically form at the end of the wing (e.g., the tip of an aircraft wing) but may also occur at other points along the wing with abrupt structural changes (e.g., at the edge of flap devices on a wing). Wingtip vortices may be associated with increased drag forces, and thus may cause inefficiencies.

SUMMARY OF PARTICULAR EMBODIMENTS

According to one embodiment, a wing includes a low pressure side, a high pressure side opposite the low pressure side, and a drag reducing apparatus coupled to the low pressure using an adhesive. The drag reducing apparatus includes a first side coupled to the low pressure side of the wing, and a second side opposite the first side, the second side comprising a plurality of vortex generators arranged in an array configuration, the array configuration of vortex generators operable to weaken a wingtip vortex generated by the wing by generating one or more vane vortices near an end of the low pressure side of the wing.

Technical advantages of certain embodiments may include providing reduced aerodynamic drag upon wings and/or reducing wake turbulence behind wings by reducing wingtip vortices. Some embodiments may provide drag reduction systems at a lower weight and/or lower cost than traditional drag reduction systems. Furthermore, some embodiments may provide drag reduction systems that require less aircraft downtime than traditional drag reduction systems. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

FIGS. 3A-3B illustrate an example adhesive panel comprising one or more microvane arrays, according to certain embodiments.

DESCRIPTION OF EXAMPLE EMBODIMENTS

Figure 1A:
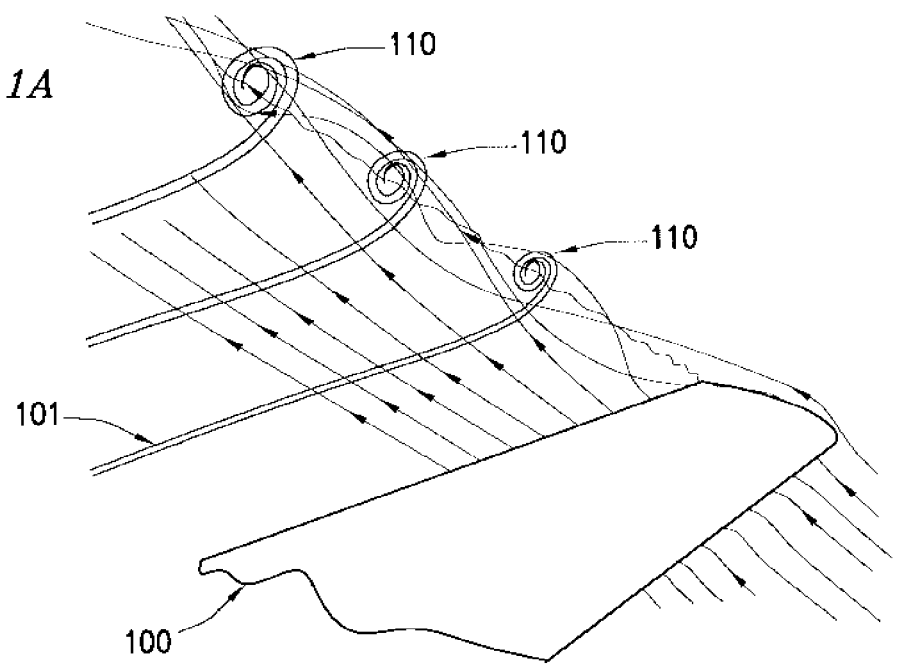
FIG. 1A illustrates a typical aircraft wing without drag reduction apparatuses, according to certain embodiments.

Typical wing designs may allow for the creation of large vortices at or around the ends of the wing, such as at the tip of an aircraft wing. These vortices may increase wake turbulence behind the wing, which may cause issues for other wings following behind. For example, wake turbulence may cause a trailing aircraft to become difficult or impossible to control. Furthermore, these vortices may add to the drag forces applied to a wing, and may therefore create fuel burn inefficiencies for the aircraft using the wing. Reducing wing vortices is therefore advantageous. Current techniques for reducing wing vortices through the addition of drag reduction apparatuses, however, may require substantial downtime for the aircraft and/or substantial expense. As an example, one current technique for reducing wing vortices includes retrofitting aircraft with winglets. The addition of these winglets to an already-deployed aircraft may require millions of dollars and many weeks of downtime.

Accordingly, teachings of the present disclosure provide a simple, low cost, modification that may be applied to an already-deployed aircraft that allows for reduction in the amount of drag applied to the wing and wake turbulence behind the wing. In particular embodiments, this may be done by decreasing the strength of the wing vortices through the use of one or more microvane arrays incorporated in an adhesive panel, which may easily be applied to already-deployed or already-created wings. Microvanes may refer to small-scale (relative to the wing chord length) vortex generators oriented approximately normal to airflow along a surface of a wing that redirect air as it flows over the wing. The size of the microvane array vortex generators may be on the order of the height of the wing boundary layer, while winglets may often be sized to a height on the order of the wingtip chord length. The microvane arrays generate a series of co-rotating vortices that flow over the wing tip and serve to weaken the rotational strength of the wingtip vortex by aerodynamically or fluid dynamically thickening the apparent radius of wingtip without requiring any physical changes to the wingtip radius structure. In particular embodiments, an adhesive panel comprising one or more arrays of microvanes may be positioned on the low pressure side of a wing such that air flowing over the low pressure side is displaced, weakening the strength of the resulting wingtip vortices. While the microvane arrays may displace air flowing on the low pressure side of a wing, it will be understood that the microvanes contemplated by the present disclosure may have a minimal effect on the overall aerodynamic properties of the wing.

The adhesive panel of microvane arrays may be composed of any suitable material for use on the exterior of an aircraft, such as aluminum, titanium, polymer or reinforced polymer material, or composite material. In certain embodiments, the array of microvanes may be arranged or oriented in such a way that maximizes the drag reduction for the particular aircraft design on which the array is installed. For example, the arrangement and/or orientation of microvanes for a BOEING 747 wing may be different than those for a BOEING 777 wing. Such designs may include provisions for whether or not the aircraft currently has winglets installed. Furthermore, in some embodiments, the adhesive panel may include one or more markings indicating proper alignment of the adhesive panel during installation on the wing. For example, lines or dots may be included on the adhesive panel that correspond to particular features of a wing, allowing an installer to properly align the panel during installation by aligning the markings with the corresponding features of the wing. Examples of wing features that can be used to align the adhesive panel include skin seams, rivet lines and other obvious wing features. The adhesive panels may be coupled to any suitable portion of the aircraft, including without limitation the low pressure side of a wing on the aircraft (e.g., the top side of a wing).

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 3, where like numbers are used to indicate like and corresponding parts. Although embodiments of the present disclosure are illustrated with respect to wings and aircraft, it will be understood that the teachings of the present disclosure may be applied to any suitable vehicle with panels that create vortices, such as watercraft, in order to increase the vehicle's efficiency.

FIG. 1A illustrates a typical aircraft wing 100 without drag reduction apparatuses, according to certain embodiments. When an airfoil such as wing 100 generates aerodynamic lift, the air on the top surface of the airfoil has lower pressure relative to the bottom surface of the airfoil. With reference to FIG. 1A, air flowing over wing 100 has a lower pressure relative to the air flowing under wing 100. Because of this, air flows from below wing 100 and around the tip to the top of wing 100 in a circular fashion, and an emergent circulatory flow pattern (i.e., a vortex) is formed. In addition, vorticity sheets 101 may be formed behind wing 100 as a result of the pressure differential. At the end of wing 100 (or any other abrupt structural change in the wing, such as at a flap opening), vorticity sheets 101 may become vortices 110 as shown in FIG. 1A. Vortices 110 may cause increased drag upon wing 100 (and thus the entire aircraft), creating fuel burn inefficiencies.

Figure 1B:
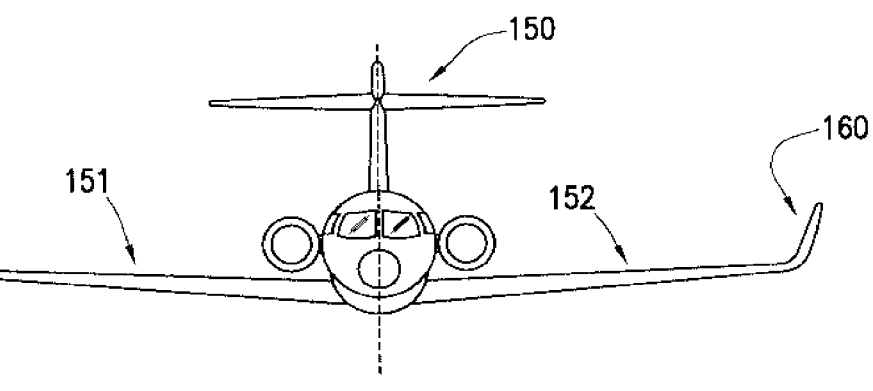
FIG. 1B illustrates an example aircraft comprising a wing with no winglet and a wing with a winglet, according to certain embodiments.
Figure 1C:
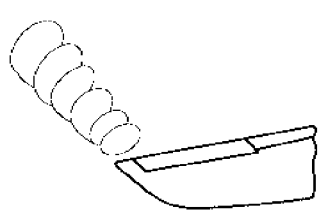
FIGS. 1C-1D illustrate an example wing with no winglet and with a winglet, respectively, according to certain embodiments.
Figure 1D:
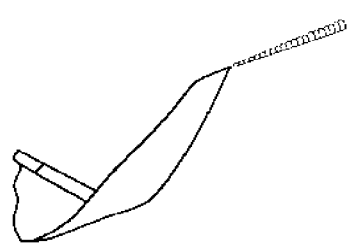

One method of reducing the drag forces induced by vortices 110 is the use of winglets. FIG. 1B illustrates an example aircraft 150 comprising wing 151 with no winglet and wing 152 with winglet 160, according to certain embodiments. Winglets 160 may increase the effective aspect ratio of wing 152 (as compared with the aspect ratio of wing 151), thus changing the pattern and magnitude of the vorticity sheets and vortices produced by the wing as illustrated by FIGS. 1C-1D. The reduced magnitude of the vorticity sheets and vortices means less effort is expended by aircraft 150, reducing the amount of fuel used by aircraft 150. While winglets 160 may serve to reduce wingtip vortices and drag, the addition of winglets 160 to aircraft (especially to currently deployed aircraft) may be quite expensive and may require substantial downtime for the aircraft. For example, the addition of winglets 160 to a currently deployed aircraft may cost more than one million dollars per aircraft and may require many weeks of downtime to install.

Accordingly, a simpler, low cost solution to reducing wingtip vortices may be desired, such as adhesive panels of microvane arrays according to the teachings of the present disclosure. Adhesive panels of microvane arrays may provide an alternative to current drag reduction systems such as winglets 160. For example, rather than choosing to install winglets 160 on an aircraft to reduce drag, an owner may choose instead to install the adhesive panels of microvane arrays. However, it will also be understood that adhesive panels of microvane arrays may be used in conjunction with current drag reduction systems such as winglets 160.

Modifications, additions, or omissions may be made to FIGS. 1A-1D without departing from the scope of the present disclosure. For example, the design of aircraft wing 100, and thus the shape or size of vortices 110, may differ slightly for different aircraft, but the principles illustrated and discussed herein may not change. As another example, the size and/or shape of aircraft 150 and the components thereof (e.g., winglet 160) may differ for different aircraft, but the principles illustrated and discussed herein may not change.

Figure 2:
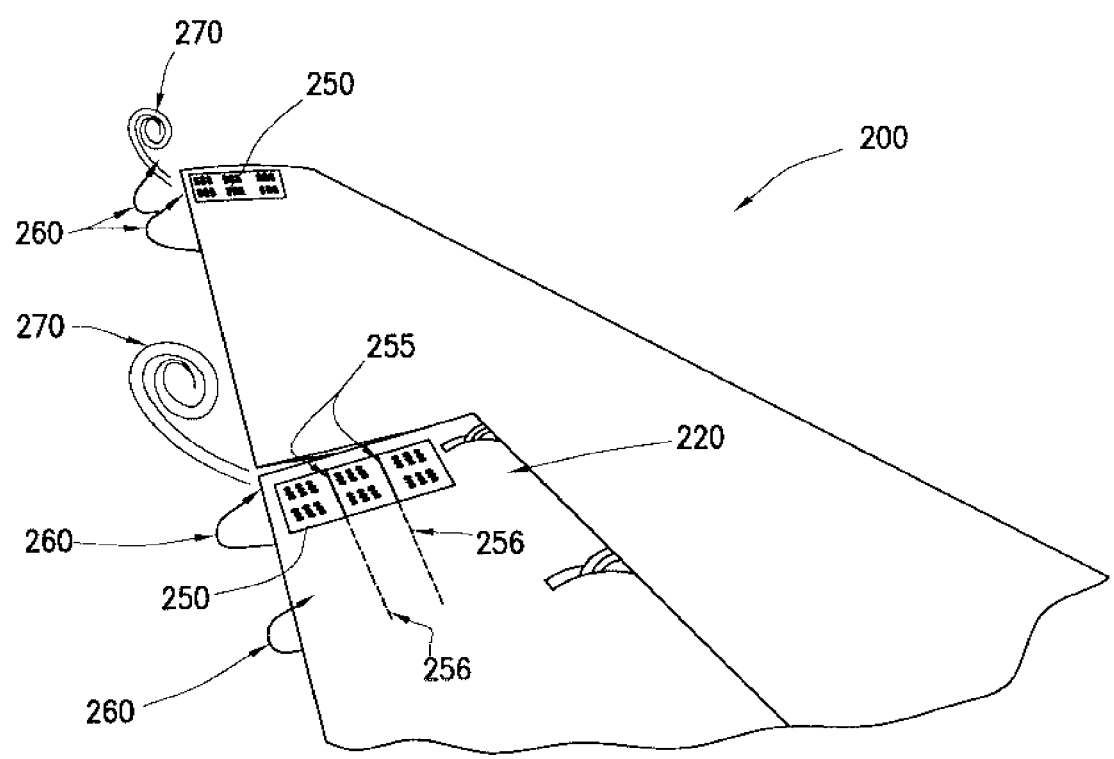
FIG. 2 illustrates an example wing comprising adhesive panels of microvane arrays, according to certain embodiments.

FIG. 2 illustrates an example wing 200 comprising adhesive panels of microvane arrays 250, according to certain embodiments. Wing 200 may be a wing of an aircraft in particular embodiments, and includes a wingtip 210 and one or more flaps 220. The adhesive panels of microvane arrays 250 include a plurality of vortex generators configured in arrays in order to redirect low pressure air flowing over wing 200 and/or inhibit high pressure air flowing upward from under wing 200. The redirection of air flow on the low pressure surface of wing 200 or inhibition of air flow from the high pressure surface of wing 200 may have the effect of making wing 200 behave as if it were thicker, thus weakening or displacing the wingtip vortices created at particular areas along the wing.

The adhesive panels of microvane arrays 250 may be located on any suitable surface of wing 200, such as at the end of the low pressure surface of wing 200 (e.g., the end tip of wing 200 or end of a flap on wing 200). In certain embodiments, when air flows over the adhesive panels of microvane arrays 250 on the low pressure surface of wing 200, one or more vane vortices 260 are formed on the low pressure surface of wing 200 such that the vane vortices impede the circulation of the relatively high pressure air flowing upward from the high pressure surface side of wing 200. The vane vortices 260 produced by microvane arrays 250 may therefore constrain the formation of the wingtip vortices 270. As shown in FIG. 2, microvane arrays 250 may be positioned adjacent to the ends of wing 200, such as at the tip of the wing or on a flap of the wing, where wingtip vortices 270 may form during flight. In certain embodiments, the precise placement of the adhesive panels of microvane arrays 250 on wing 200 is based on the specific wing application, such as the model of aircraft (e.g., BOEING 747) on which the adhesive panels of microvane arrays 250 is installed.

In particular embodiments, adhesive panels of microvane arrays 250 are positioned on wing 200 such that the centers of vane vortices 260 are different from the centers of wingtip vortices 270. This provides an opposition region in which the vane vortex 260 and the wingtip vortex 270 oppose each other, which may cause a combined effective vortex core to be distributed between the vane vortices 260 and the wingtip vortex 270. This may provide a rapid far field vortex dissipation effect, lessening the size of wingtip vortex 270. It will be understood, however, that although vane vortices 260 rotate in the same direction as the wingtip vortex 270, the induced velocities of vane vortices 260 and wingtip vortex 270 reinforce each other, reducing or eliminating lift degradation or induced drag on wing 200.

In particular embodiments, the adhesive panels of microvane arrays 250 include one or more markings 255 as shown in FIG. 2. Markings 255 may include any suitable type of markings (e.g., lines) that indicate proper placement of adhesive panels of microvane arrays 250 on wing 200. In particular embodiments, markings 255 indicate alignment with respect to one or more of the features of wing 200. For example, as shown in FIG. 2, markings 255 align with the skin seams 256 on flap 220, indicating that the markings should align with the seam when the adhesive panel 250 is placed on to wing 200.

Modifications, additions, or omissions may be made to FIG. 2 without departing from the scope of the present disclosure. For example, the design of wing 200, including but not limited to the design of flaps 220, may differ depending on the aircraft on which microvane arrays 250 are installed. As another example, the placement of microvane arrays 250 or the markings thereon may differ depending on the aircraft on which microvane arrays 250 are installed.

FIGS. 3A-3B illustrate an example adhesive panel 300 that includes one or more microvane arrays 310. Adhesive panel 300 is composed of any suitable materials for use on a wing (i.e., rigid and relatively lightweight), such as aluminum, titanium, polymer or reinforced polymer materials, or composite materials. On one side, adhesive panel 300 comprises an adhesive suitable for use in coupling the adhesive panel 300 to a wing (i.e., an adhesive that can withstand high velocities and many different weather conditions). For example, the adhesive may be an epoxy. On the opposite side, adhesive panel 300 comprises one or more microvane arrays 310. Microvane arrays 310 each include a plurality of vortex generators 320 configured in a particular arrangement, which is determined by the design of the wing on which the microvane arrays 310 are to be installed. The microvane arrays 310 of adhesive panel 300 may be arranged with particular vertical spacing 311 and horizontal spacing 312, which is determined by the intended application (e.g., which aircraft the adhesive panel 300 is intended to be installed on). In certain embodiments, the vertical spacing 311 or horizontal spacing 312 is between 0.1 and 1 inch.

The vortex generators 320 of microvane arrays 310 are any suitable size and/or shape, and are oriented in any suitable way. In certain embodiments, the design (including size, shape, or orientation (including the position relative to the wing or angle relative to the low pressure surface)) of the vortex generators 320 of microvane arrays 310 is optimized for particular speeds of airflow. For example, the design of the vortex generators 320 is optimized for cruising speeds of an aircraft (e.g., the average speed at which the aircraft flies between takeoff and landing) on which the microvane arrays 310 are to be installed in order to maximize drag reduction over time. As another example, the design of the vortex generators 320 on microvane arrays 310 is optimized for speeds (e.g., landing approach speeds) at which high angles of attack and lift enhancing aircraft configurations such as flap extension tend to create or greatly enhance the strength of tip vortices in order to reduce wake turbulence.

In certain embodiments, the height of the vortex generators 320 or microvane array 310 is within 0.25 and 0.5 inches. In certain embodiments, the shapes of the vortex generators 320 of microvane arrays 310 are semi-spherical. In some embodiments, the shapes of the vortex generators 320 of microvane arrays 310 are rectangular. In other embodiments, the shapes of the vortex generators 320 of microvane arrays 310 are cone-shaped. In some embodiments, the shapes of the vortex generators 320 of microvane arrays 310 are pyramid-shaped (e.g., triangular, square, pentagonal, or hexagonal).

In particular embodiments, the vortex generators 320 of microvane arrays 310 are oriented at an angle of approximately normal to a portion of the low pressure surface on which they are to be installed. However, in other embodiments, the vortex generators 320 of microvane arrays 310 are oriented at certain angles relative to the normal axis of the low pressure surface on which they are to be installed, such as at 30 or 45 degrees relative to the axis normal to the low pressure surface.

Modifications, additions, or omissions may be made to FIGS. 3A-3B without departing from the scope of the present disclosure. For example, although illustrated as comprising three vortex generators 320 each, microvane arrays 310 may comprise any suitable number of vortex generators 320 and that each microvane array 310 of panel 300 may comprise different numbers of vortex generators 320. As another example, although illustrated as comprising vortex generators 320 with the same size shape, microvane arrays 310 may comprise vortex generators 320 with various sizes and/or shapes. As yet another example, although illustrated in an arrangement with uniform spacing, microvane arrays 310 of adhesive panel 300 may be arranged in a non-uniform manner.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A drag reducing apparatus configured to be coupled to an exterior surface of a vehicle, the drag reducing apparatus comprising a plurality of vortex generators arranged in an array configuration, the array configuration of vortex generators configured to generate a series of co-rotating vortices that serve to weaken a rotational strength of a vortex generated by the vehicle, wherein:

a spacing of the array configuration of vortex generators is between 0.1 and 1 inch; and each of the plurality of vortex generators is between 0.25 and 0.5 inches in height.

2. The drag reducing apparatus of claim 1, wherein the drag reducing apparatus is composed of aluminum, titanium, a polymer, or a composite material.

3. The drag reducing apparatus of claim 1, wherein a shape of each of the plurality of vortex generators is selected from the group consisting of semi-spherical, pyramid-shaped, and cone shaped.

4. The drag reducing apparatus of claim 1, wherein the drag reducing apparatus is configured to be coupled to a flap of a wing of an aircraft.

5. The drag reducing apparatus of claim 1, wherein the drag reducing apparatus is configured to be coupled proximate a wingtip of the vehicle.

6. The drag reducing apparatus of claim 1, wherein the drag reducing apparatus is configured to be coupled to the exterior surface of the vehicle using an adhesive.

7. An apparatus comprising a plurality of vortex generators arranged in an array configuration, the array configuration of vortex generators configured to generate a series of co-rotating vortices that serve to weaken a rotational strength of a vortex generated by a vehicle, wherein:

a spacing of the array configuration of vortex generators is between 0.1 and 1 inch; and each of the plurality of vortex generators is between 0.25 and 0.5 inches in height.

8. The apparatus of claim 7, wherein the apparatus is composed of aluminum, titanium, a polymer, or a composite material.

9. The apparatus of claim 7, wherein a shape of each of the plurality of vortex generators is selected from the group consisting of semi-spherical, pyramid-shaped, and cone shaped.

10. The apparatus of claim 7, wherein the apparatus is configured to be coupled to a flap of a wing of an aircraft.

11. The apparatus of claim 7, wherein the apparatus is configured to be coupled proximate a wingtip of the vehicle.

12. The apparatus of claim 7, wherein the apparatus is configured to be coupled to an exterior surface of the vehicle using an adhesive.

13. The apparatus of claim 12, wherein the exterior surface is a wing.

14. The apparatus of claim 7, wherein the vehicle is an aircraft.

15. The apparatus of claim 7, wherein the vehicle is a watercraft.

16. An apparatus for reducing drag, the apparatus comprising:

a first side configured to be coupled to a structure; and a second side comprising a plurality of vortex generators arranged in an array configuration, wherein:

a spacing of the array configuration of vortex generators is between 0.1 and 1 inch; and each of the plurality of vortex generators is less than 0.5 inches in height.

17. The apparatus of claim 16, wherein the apparatus is composed of aluminum, titanium, a polymer, or a composite material.

18. The apparatus of claim 16, wherein a shape of each of the plurality of vortex generators is selected from the group consisting of semi-spherical, pyramid-shaped, and cone shaped.

19. The apparatus of claim 16, wherein the first side of the apparatus comprises an adhesive.

* * * * *